(12) United States Patent
Stewart et al.

(10) Patent No.: US 12,479,245 B2
(45) Date of Patent: Nov. 25, 2025

(54) TIRE MONITOR WITH CLOSE PROXIMITY CONNECTIVITY

(71) Applicant: Sensata Technologies, Inc., Attleboro, MA (US)

(72) Inventors: William D. Stewart, Antrim (GB); Ian Elliott, Ballybogey (GB)

(73) Assignee: Sensata Technologies, Inc., Attleboro, MA (US)

( * ) Notice: Subject to any disclaimer, the term of this patent is extended or adjusted under 35 U.S.C. 154(b) by 237 days.

(21) Appl. No.: 18/079,715

(22) Filed: Dec. 12, 2022

(65) Prior Publication Data

US 2023/0191855 A1    Jun. 22, 2023

Related U.S. Application Data

(60) Provisional application No. 63/290,128, filed on Dec. 16, 2021.

(51) Int. Cl.
*B60C 23/04* (2006.01)
*H04W 4/80* (2018.01)

(52) U.S. Cl.
CPC .......... *B60C 23/0461* (2013.01); *H04W 4/80* (2018.02)

(58) Field of Classification Search
CPC ........... B60C 23/0461; B60C 23/0462; B60C 23/0479; B60C 23/0442; B60C 23/0422; B60C 23/0408; H04W 4/80
USPC ................................. 340/442, 447
See application file for complete search history.

(56) References Cited

U.S. PATENT DOCUMENTS

| | | | |
|---|---|---|---|
| 11,872,853 B2* | 1/2024 | Kandler | B60C 23/0461 |
| 2003/0008692 A1* | 1/2003 | Phelan | B60C 23/0408 |
| | | | 455/574 |
| 2006/0158324 A1* | 7/2006 | Kramer | B60C 23/0479 |
| | | | 340/447 |
| 2011/0304454 A1* | 12/2011 | Lickfelt | B60C 23/0479 |
| | | | 340/447 |
| 2018/0361801 A1* | 12/2018 | Okumura | B60C 23/0408 |
| 2019/0070909 A1* | 3/2019 | Liu | B60C 23/0471 |
| 2019/0248193 A1* | 8/2019 | Scheibenzuber | B60C 23/0471 |
| 2020/0062049 A1 | 2/2020 | Wagner | |
| 2021/0339583 A1* | 11/2021 | Regef | B60C 23/0471 |
| 2022/0166453 A1 | 5/2022 | Cheng | |
| 2022/0379670 A1* | 12/2022 | Kandler | B60C 23/0461 |

FOREIGN PATENT DOCUMENTS

| | | | |
|---|---|---|---|
| CN | 101423008 A | | 5/2009 |
| CN | 118560200 A | * | 8/2024 |
| DE | 202021103172 U1 | | 8/2021 |
| WO | WO2022039719 A1 | | 2/2022 |

OTHER PUBLICATIONS

Extended European Search Report mailed Apr. 24, 2023 for European Patent Application No. 22213858.8, 7 pages.
Office Action for European Application No. 22213858.8, Dated Feb. 18, 2025, 6 pages.

* cited by examiner

*Primary Examiner* — Eric Blount
(74) *Attorney, Agent, or Firm* — Lee & Hayes, P.C.

(57) ABSTRACT

A tire monitor includes a sensor generating tire data. The tire monitor is configured to wake in response to a low frequency interrupt signal received from a remote source. Upon waking, the tire monitor scans Bluetooth Low Energy (BLE) channels to establish a BLE connection with the remote source. The tire monitor communicates with the remote source over the BLE connection.

18 Claims, 3 Drawing Sheets

TIRE MONITOR WITH CLOSE PROXIMITY CONNECTIVITY

CROSS-REFERENCE TO RELATED APPLICATIONS

The application claims the benefit of priority of U.S. Provisional Patent Application No. 63/290,128, entitled "A Low Power Tire Pressure Monitoring Solution For A Close Proximity Quick Connect," filed on Dec. 16, 2021, the entirety of which is hereby incorporated by reference.

FIELD OF THE TECHNOLOGY

The subject disclosure relates to tire pressure monitoring systems, and more particularly to improved systems for transferring data between a tire monitor associated with a vehicle tire and a computing system.

BACKGROUND OF TECHNOLOGY

Proper tire pressure is important to proper vehicle functioning. For instance, tires having low tire pressure may be unsafe and/or may reduce operating efficiency of the vehicle on which they are mounted, e.g., by reducing gas mileage of the vehicle, reducing vehicle responsiveness, causing tire failure, or the like. Conventionally, a tire pressure detector or tire monitor is attached to a tire, or to a wheel on which the tire is mounted. The tire monitor detects a pressure of the associated tire. The detected pressure may be transmitted to a computing device associated with a tire pressure monitoring system.

Conventional technologies use low frequency ("LF") and radio frequency ("RF") as a means to interrogate and program tire monitors via bidirectional communications. However, data transfer to the sensor is slow due to the low operating frequencies of the associated LF/RF channels. Recently, tire monitors have been configured for transferring data via wireless protocols, such as Bluetooth, Bluetooth Low Energy (BLE), or the like. The use of Bluetooth or similar protocols allows for the monitor to transmit and receive data more quickly and efficiently. Moreover, such protocols may facilitate larger data transfers, which may be required when programming the tire monitor, for example. However, conventional systems using BLE or similar protocols may have an adverse impact on the tire monitor. For instance, the tire monitor may be configured to continuously scan the BLE channel for a BLE request from a potential interrogative device, e.g., to connect to the interrogating device via the BLE channel. This continuous scanning can significantly reduce battery life—in some examples, the lifetime for the battery may be reduced from about 10 years to about 3 years. Alternatively, the tire monitor may be configured to scan periodically, e.g., to conserve battery life. However, configuring the tire monitor in this manner can result in reduced response times, which may be undesirable.

BRIEF DESCRIPTION OF THE DRAWINGS

So that those having ordinary skill in the art to which the disclosed systems and techniques pertain will more readily understand how to make and use the same, reference may be had to the following drawings.

DETAILED DESCRIPTION

Figure 1:
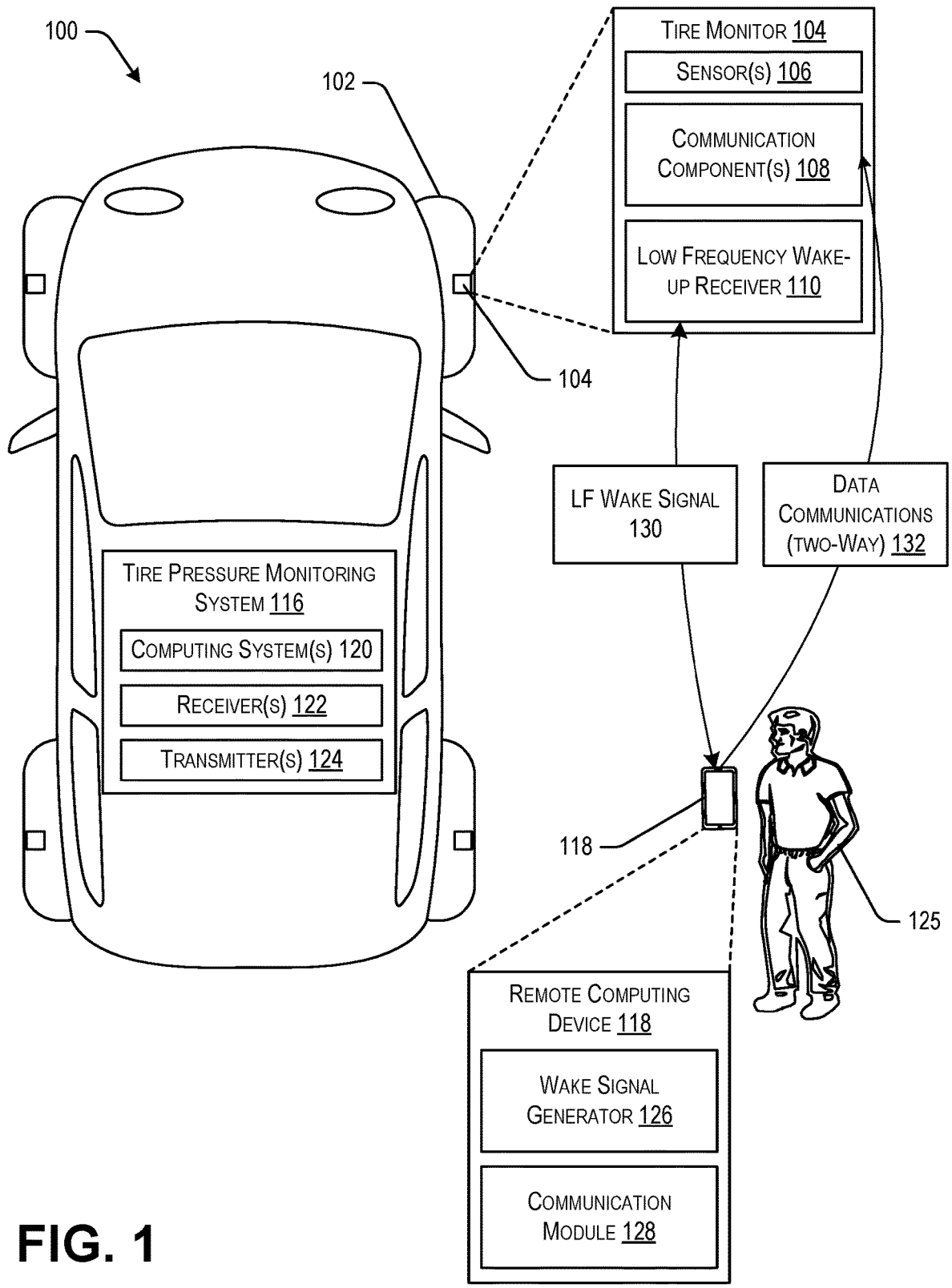
FIG. 1 is a schematic representation of an environment including a vehicle including tire monitors and a tire pressure monitoring system and a remote interrogation device, in accordance with aspects of this disclosure.

The subject technology overcomes prior art problems associated with tire pressure monitors. For example, systems and techniques described herein provide improved tire monitors usable with myriad different tire monitoring systems. For example, the technology described herein may facilitate transfer of data using high frequency data transmission protocols, e.g., via BLE or the like, but with improved battery life and reduced response latency. The advantages, and other features of the systems and methods disclosed herein, will become more readily apparent to those having ordinary skill in the art from the following detailed description of certain preferred embodiments taken in conjunction with the drawings which set forth representative examples of the present disclosure.

In some aspects of this disclosure, a tire monitor is coupled to a tire of an automobile. The tire monitor includes one or more sensors, such as a pressure monitor sensor, a motion sensor, a temperature sensor, and/or one or more other sensors. The sensor(s) generate sensor data that can be transmitted to one or more computing systems.

In aspects of this disclosure, the tire monitor is configured to transmit the sensor data (and/or other data) via one or more high frequency communication protocols, e.g., Bluetooth Low Energy (BLE), or the like. For example, the tire monitor can include one or more communication components to facilitate bidirectional data transfer via the protocol(s).

According to additional aspects of this disclosure, the tire monitor also includes a low-frequency wake-up receiver. During periods of non-use, aspects of the tire monitor, e.g., the communication components, may be configured in an inactive or sleep state. The low-frequency wake-up receiver is configured to receive a low-frequency wake signal and, upon receiving the wake signal, to wake the communication components. In examples, the low-frequency wake-up receiver uses significantly less power to listen for a wake signal, e.g., as compared to using the communication component to continuously scan for data requests using the high-frequency communication protocols.

According to additional aspects of this disclosure, the wake signal can include a modulated signal. The modulated signal can include information associated with a remote device requesting data transfer. For example, the modulation information can include an identification of the remote device requesting data transfer, an identification of a channel for communicating with the remote device, a key or signature for establishing the communication connection between the tire monitor and the remote device, or the like. In some instances, the modulation information may be used to ensure that the tire monitor syncs or connects with the proper remote device, e.g., in an environment in which many devices may be communicating via the communication protocol.

As a result of the improved tire monitors disclosed herein, a tire monitor can be configured to communicate using a high frequency, bidirectional communication protocol. However, the use of the low frequency wake-up receiver allows for near-instant response to a wake signal with minimal power, overcoming the drawbacks of conventional tire monitors. These and other features and benefits of this disclosure will be discussed with reference to the Figures.

FIG. 1 illustrates a vehicle 100 including a number of tires 102. Each of the tires 102 includes a tire monitor 104. Specifically, one of the tire monitors 104 is coupled to each of the tires 102 (e.g., via a tire mount, a valve mount, or the like). According to aspects of this disclosure, each of the tire monitors 104 can include, among other features, one or more sensors 106, one or more communication components 108, and a low frequency wake-up receiver 110. Although not illustrated in FIG. 1, each of the tire monitors 104 may also include one or more power sources, e.g., batteries, and/or other conventionally-known components.

The sensor(s) 106 are configured to generate signals associated with one or more measured attributes of the tires 102. For example, the sensor(s) 106 can include a pressure sensor configured to generate pressure data associated with the associated tires. In another example, the sensor(s) 106 can include a temperature sensor configured to generate temperature data associated with the tire. The sensor(s) 106 can also, or alternatively, include motion sensors. For example, motion sensor(s) can include an accelerometer, a gyroscope, an inertial measurement unit, a resolver, a rotary sensor, a position sensor, or the like. The sensor(s) 106 may generate updated data at a predetermined frequency, e.g., according to a sampling rate. The sensor(s) 106 may be configurable, e.g., the sampling rate may be adjustable. For example, the sensor(s) 106 may generate data at a first sampling rate when the vehicle is in motion and at a second sampling rate when the vehicle is stationary.

The communication component(s) 108 is/are configured to generate, receive, and/or transmit signals using one or more communication protocols or standards. In examples, the communication component(s) can include one or more Bluetooth Low Energy (BLE) transceivers configured to generate, receive and/or transmit signals using conventional BLE standards and/or the like. The techniques described herein are not limited to using BLE technologies. In other examples, the communication component(s) 108 can include transceiver(s) to communicate according to one or more other (or additional) transceivers and/or other features for transmitting via one or more other protocols, such as high frequency transmission protocols like (classic) Bluetooth, ultra-wideband (UWB), or the like. For example, the communication component(s) 108 may be configured to generate and/or transmit signals associated with sensor data generated by the sensor(s) 106. Without limitation, the communication component(s) 108 may be configured to transmit data at frequencies equal to or greater than about 1 GHz. For example, BLE operates using the 2.4 GHz frequency range and UWB operates using frequencies from 3.1 GHz to 10.6 GHz.

The communication component(s) 108 may be configured to generate output signals. The output signals may be radio frequency (RF) signals carrying information associated with data generated by the sensor(s) 106. For example, the output signals associated with the communication component(s) 108 carry information generated by the sensor(s) 106, e.g., tire pressure data, and may conform to a first protocol. The communication component(s) 108 may also be configured to receive signals, e.g., command or request signals. In examples described herein, the communication component(s) 108 can receive requests to transmit sensor data, can receive write data, can receive requests to read data, and/or the like. As detailed further herein, the communication component(s) 108 can be configured to transmit sensor data to a computing device spaced from, e.g., remote from, the tire monitor 104. Without limitation, the computing device may be associated with a tire pressure monitoring system on the vehicle and/or a separate computing device, e.g., remote from the vehicle 100.

In some conventional examples, the communication component(s) 108 can scan for communications, e.g., from a remote device. For example, when the communication component(s) 108 include BLE transceiver(s), in some conventional systems, the communication component(s) 108 can continuously scan BLE channels for data transfer requests. In other conventional implementations, the communication component(s) 108 can periodically scan BLE channels for data transfer requests. As noted above, the continuous (or periodic) waking of the BLE transceiver(s) at the tire monitor(s) 104 may consume a relatively large amount of energy and/or increase data transfer latency.

To reduce this latency and/or to reduce power consumption, in some instances, the tire monitor(s) 104 include the associated low frequency wake-up receiver (LF WuRx) 110. The LF WuRx 110 may be configured to listen for a wake signal. For example, the communication component(s) 108 may be placed in a reduced power, e.g., sleep or inactive, mode while the LF WuRx 110 listens for these wake-up commands. Because the LF WuRx 110 consumes considerably less power than the communication component(s) 108, the frequency at which requests for data transfer are listened for may be increased, thereby decreasing latency associated with the system.

In examples, the LF WuRx 110 may comprise a low frequency channel to wake the tire monitor 104, e.g., to wake the communication component(s) 108. The low frequency channel is used on an interrupt basis, and, as such, consumes minimal energy when compared to a BLE or other high-frequency receiver. For instance, and with limitation, the LF WuRx 110 may have an associated frequency of from between about 30 kHz and about 300 kHz. In one non-limiting example, the LF channel can be associated with a frequency of 125 kHz.

In the example of FIG. 1, the tire monitors 104 may be configured to communicate with a tire pressure monitoring system 116. As also illustrated, the tire monitors 104 may also be configured to communicate with a remote computing device 118, which may be a personal user device.

As illustrated in FIG. 1, the tire pressure monitoring system 116 includes one or more computing systems 120 onboard the vehicle 100. Generally, the tire pressure monitoring system 116, using the computing system(s) 120, includes functionality to receive signals from the tire monitors 104. In examples, the tire pressure monitoring system 116 includes logic to determine whether any of the associated tires 102 has a tire pressure that is outside of a certain predefined operating limit. For instance, the tire pressure monitoring system 116 can include a pressure for each of the tires 102 based on received data, and identify that the pressure of the tire is lower than a first threshold pressure (e.g., the tire is underinflated) or higher than a second threshold pressure (e.g., the tire is overinflated). The tire pressure monitoring system 116 can also include logic to transmit tire information, e.g., tire pressure, a determined alarm state, and/or the like, for presentation on an operator interface (not shown in FIG. 1) in the vehicle 100. Without limitation, the tire pressure monitoring system 116 can transmit data for presentation via a wired or wireless communication connection.

In the example of FIG. 1, the tire pressure monitoring system 116 is illustrated as including one or more receivers 122 and one or more transmitters 124. The receiver(s) 122 may be configured to receive signals from the tire monitors 104. The tire pressure monitoring system 116 is generally configured, e.g., at manufacture, for the receiver(s) 122 to cooperate with the tire monitors 104 installed at the tires 102 at manufacture/assembly. Specifically, and as noted above, the protocol used to transmit signals from the tire monitors 104 and received at the tire pressure monitoring system 116 may be BLE, UWB, or other high RF techniques. Although in other examples other communication protocols, including wireless and/or wired protocols, may be used to communicate between the receiver(s) 122 and the tire monitor 104.

The transmitter(s) 124 may be configured to transmit data. For instance, the transmitter(s) 124 can transmit data to the tire monitor 104, e.g., to request information, to instruct a reconfiguration such as a modified sampling rate, or the like. The transmitter(s) 124 can also be configured to transmit data to other electronic devices, e.g., an electronic device associated with an owner of the vehicle 100, to a display of the vehicle 100, or the like. The transmitter(s) 124 may be configured to send data according to any of a number of conventional protocols.

FIG. 1 also shows that the tire monitor 104 is configured to communicate with the remote computing device 118. The remote computing device 118 is illustrated as being a personal electronic device, e.g., a mobile phone, a tablet, or the like, associated with a user 125. The device may include a tool for communicating with the tire monitors 104, e.g., to configure aspects of the tire monitor 104, to read/write tire identification information, and/or the like. In examples, the user 125 may be an owner of the vehicle 100, a lessee, a technician, a fleet manager, or any individual associated with the vehicle 100. As will be appreciated, the remote computing device 118 and the user 125 are shown for example only. In implementations, the remote computing device 118 can be any computing device capable of communicating with the tire monitor(s) 104.

As illustrated in FIG. 1, the remote computing device 118 includes a wake signal generator 126 and a communication module 128. As will be appreciated, the remote computing device 118 can include additional components, including but not limited to a power source, a user interface element, a display, and/or additional elements.

The wake signal generator 126 includes functionality to generate a low frequency wake signal 130. The low frequency wake signal 130 may be an interrupt signal at a frequency between about 3 kHz and about 300 kHz. The remote computing device 118 may be configured to broadcast the wake signal 130 to establish a data connection with the tire monitor 104.

In some examples, the wake signal generator 126 can include functionality to generate the LF wake signal to comprise modulated data. For example, the modulated data can include information associated with the remote computing device 118 and/or information associated with a communication connection via which the remote computing device 118 is to communicate with the tire monitor 104. The modulated data can include a key, a signature, or an ID associated with the remote computing device 118. In practice, the tire monitor 104 can receive the modulated data and use the modulated data to connect with, e.g., open a communication channel with, a device having the same key/signature/ID, e.g., the computing device 118. The modulated data may be used to ensure that the tire monitor 104 is connected with the device that initiated the communication connection request, e.g., when other radio devices using the same connection protocols may be present in the environment. For example, the modulated data may allow the tire monitor 104 to ensure establishment of a BLE connection with the remote computing device 118, even when other devices may be transmitting via BLE. Stated differently, the modulated data may allow for establishing a secure BLE communications channel between the tire monitor 104 and the device 118 within close range in a BLE noisy environment.

The communication module 128 includes functionality to communicate with the tire monitor 104. More specifically, the communication module 128 includes functionality to generate, transmit, and/or receive data communications 132 e.g., to/from the communication component(s) 108 of the tire monitor 104. In examples, the communication module 128 includes functionality to establish a communication channel with the communication component(s) 108 to receive sensor data generated by the senor(s) 106, to write data to the tire monitor 104, to read data from the tire monitor 104, or the like. For example, the communication module 128 can be configured to establish a BLE communication channel with communication component(s) 108. As illustrated, the data communications 132 may be two-way data communications, e.g., allow for read/write capabilities between the device 118 and the tire monitor 104.

According to one example scenario that may be implemented using the components of FIG. 1, the user 125 may desire to program the tire monitor 104, e.g., upon mounting of the tire 102 to the vehicle. In this example, the user 125, holding the remote computing device 118, comes into proximity, e.g. close proximity to the tire monitor 104. The remote computing device 118 is configured, e.g., by the wake signal generator 126, to transmit the LF wake signal 130. For instance, the remote computing device 118 can broadcast the LF wake signal 130. In examples, it may be required that the remote computing device 118 be in close proximity of the tire monitor 104, as the LF channel may work in the magnetic domain, where only very near field reception is achievable.

Once in proximity of the tire monitor 104, the LF wake signal is received at the LF WuRx 110, e.g., via a low frequency channel. The LF wake signal 130, e.g., acting as an interrupt received by the LF WuRx 110, causes the communication component(s) 108 of the tire monitor to wake, e.g., via a wired interrupt. Upon waking, the communication component(s) 108 begin scanning communication channels, e.g., BLE channels, to determine a channel for communication with the remote computing device 118. In examples, as noted above, the LF wake signal 130 can include the modulated data, which can inform the communication component(s) 108 as to the channel to establish communication. For instance, the modulated data can be used to identify, authenticate and/or otherwise facilitate creation of a communication link between the communication component(s) 108 and the communication module 128 of the remote computing device 118.

Once established, communication between the tire monitor 104 and the remote computing device 118 is performed via the data communications 132. As will be appreciated, the data communications may be via LTE or some other high-frequency protocol, which may facilitate bi-directional, fast, and/or reliable transmission of large amounts of data. In the example, the user 125 may interface with the remote computing device 118 to receive information from the tire monitor 104 and/or to send information to the tire monitor 104, via the data communication 132 to perform programming of the tire monitor 104. Once the programming is complete, the remote computing device 118 may terminate the communication channel. For example, upon the communication channel being terminated, the tire monitor 104 may configure the communication component(s) 108 in a sleep or inactive state, with the LF WuRx 110 waiting for a next wake signal. In other examples, the tire monitor 104 can "time-out," e.g., upon passage of a predetermined time in which no data is received from the remote computing device 118 via the communication channel. Upon "timing-out," the tire monitor 104 may similarly configure the communication component(s) 108 in the sleep or inactive state.

As will be appreciated from the foregoing, the tire monitor 104 of the present disclosure includes functionality for communicating with the remote computing device 118 using a robust, high-frequency data protocol, e.g., BLE, but establishing that connection in response to a LF wake signal. For instance, the techniques described herein also facilitate a communication connection using an LF 'burst' from an interrogative device, e.g., the device 118, to wake up the monitor that subsequently initiates a BLE connection. Therefore, unlike in conventional configurations, there is no requirement to continuously scan the BLE channel. Therefore, the energy that would otherwise be consumed (wasted) via the BLE channel is conserved thus making low response latency BLE (or other bi-directional, high frequency) interrogation possible, thus allowing for more robust and faster data transfer.

Figure 2:
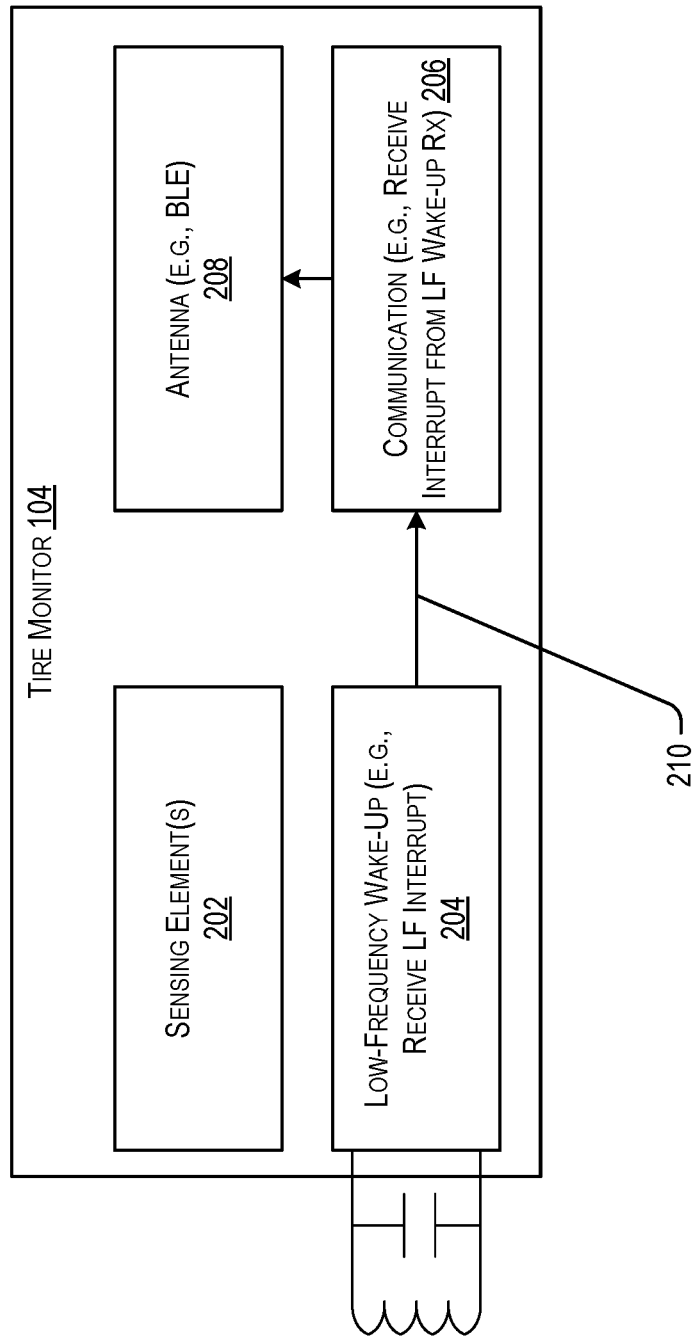
FIG. 2 is a schematic representation of a tire monitor, in accordance with aspects of this disclosure.

FIG. 2 is a schematic diagram showing additional aspects of the tire monitor 104. In FIG. 2, the tire monitor 104 is illustrated as including a plurality of modules or other logically-connected computing blocks. For instance, various of the illustrated blocks and/or other aspects of the tire monitor 104 may be implemented in an intelligent hardware device, e.g., a central processing unit (CPU), a microcontroller, an application specific integrated circuit (ASIC), or may be implemented as part of a reconfigurable device. Aspects of the tire monitor 104 can include random access memory (RAM) and read-only memory (ROM) which may include instructions that are configured to, when executed (or when compiled and executed), cause aspects of the tire monitor 104 to perform various functions described herein (including but not limited to the operations of the process illustrated in FIG. 3 and discussed further below.) Various components of the tire monitor 104 may be implemented using one or more separate CPUs or ASICs, for example, and the components may, individually or collectively, be implemented with one or more ASICs adapted to perform some or all of the applicable functions in hardware. Each of the noted components may be a means for performing one or more functions related to operation of the system.

As illustrated, the tire monitor 104 includes one or more sensing elements 202, a low-frequency wake-up component 204, a communication component 206, and an antenna 208. The sensing element(s) 202 may be the sensor(s) 106 discussed above.

The low-frequency wake-up component 204 may correspond to the LF WuRx discussed above. Specifically, the low-frequency wake-up component 204 may be configured to detect a low-frequency wake signal, e.g., as a low frequency interrupt. As illustrated, the low-frequency wake-up component 204 can be implemented via an electrical circuit, e.g., including an inductor and a capacitor, e.g., as an LC circuit. In examples, the LF wake-up is configured to receive a wake signal via an LF channel, e.g., having a frequency of from about 30 kHz to about 300 kHz. In examples, the LF channel may work in the magnetic domain, where only very near field reception is achievable by the low frequency wake-up component 204.

Upon receiving the interrupt signal, the low-frequency wake-up component 204 can signal the communication component 206 to wake up, or otherwise become active. The communication component 206 may correspond to the communication component(s) 108 discussed above. In an example, the low frequency wake-up component 204 can transmit an interrupt signal via a wired (or wireless) connection 210. Upon receiving the interrupt from the low-frequency wake-up component 204, the communication component 206 can include functionality to scan communication channels to establish communication via one of the communication channels, e.g., with the device that initiated the LF wake-up. As discussed above, the LF wake signal can include connection information, e.g., ID information, a key, a signature, or the like, to allow the communication component 206 to establish a connection with the appropriate device.

The antenna 208 may be configured to receive and/or transmit data from the tire monitor 104. As described above, data may be transferred to/from the tire monitor using a high frequency communication such as BLE. Thus, in examples, the antenna 208 may be a BLE antenna.

As noted above, aspects of the tire monitor 104 may be implemented as one or more computing devices or computing blocks. Without limitation, the low-frequency wake-up receiver may be implemented as a first computing device, e.g. a first, tire monitor chipset. The first chipset may be configured to include circuitry that implements the low-frequency wake-up, e.g., via the LC circuit. Also in non-limiting examples, the communication component 206 can be implemented as a second computing device, e.g., a second, BLE chipset, including functionality to transmit data according to BLE protocols. Of course, other configurations and embodiments also are contemplated.

Although not shown in FIG. 2, the tire monitor 104 can include a number of additional components to facilitate the functionality described herein, as will be appreciated by those having ordinary skill in the art. For instance, the tire monitor 104 may include one or more external oscillators, which may be used to provide a reference frequency that is used in one or more RF components within the tire monitor 104. As is conventional in the art, the tire monitor 104 can also include a motion sensor, an external low frequency (LF) circuit, and/or a power source. For example, the motion sensor may be used to initiate transmission from the tire monitor 104 to the tire pressure monitoring system 116, e.g., based on detected events from an accelerometer or other type of shock detection apparatus. The LF circuit may be used for receiving external inputs, and the power source, which may be a battery, may be used to provide power to the various components of the tire monitor 104.

Figure 3:
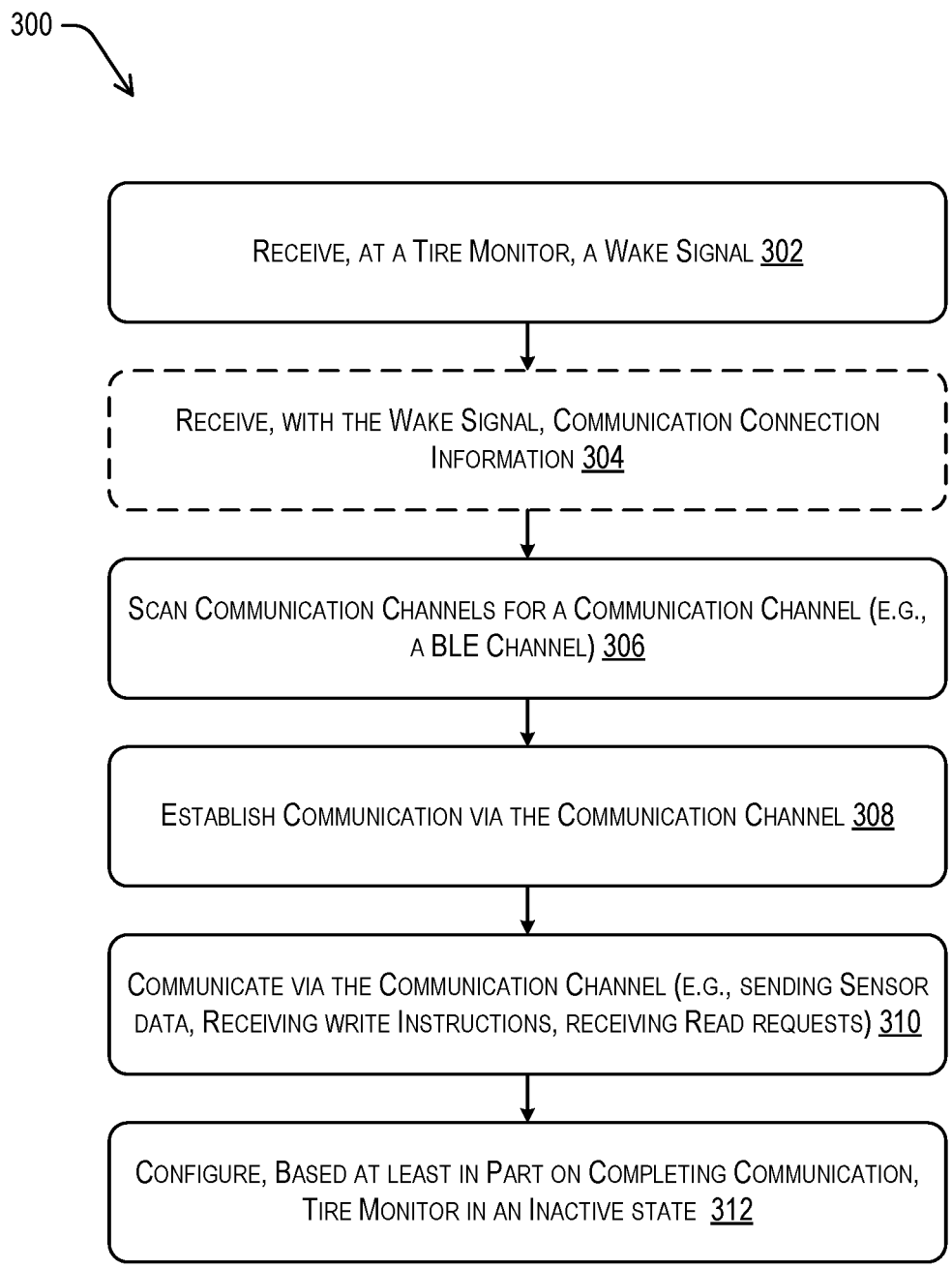
FIG. 3 is a flowchart illustrating an example process for monitoring tire pressure in stationary vehicles, in accordance with aspects of this disclosure.

FIG. 3 illustrates an example process 300 in accordance with aspects of the disclosure. The process is illustrated as logical flow graphs, with each operation representing a sequence of operations that can be implemented in software, hardware, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The various illustrative operations, components, and systems described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

In more detail, FIG. 3 is a flowchart showing the example process 300, which is a process for establishing and using a communication connection between a tire monitor and an interrogating device. In examples, aspects of the process 300 can be performed by the tire monitors 104 discussed above with reference to FIGS. 1 and 2. However, the process 300 is not limited to being performed by the tire monitors 104, and the tire monitors 104 are not limited to performing the process 300.

At an operation 302, the process 300 includes receiving, at a tire monitor, a wake signal. As detailed herein, the wake signal may be a low frequency signal emitted, e.g., broadcast, by a device remote from the tire monitor. For example, the wake signal may be the wake signal 130 discussed above. When emitted in close proximity to the tire monitor, a low frequency wake-up receiver receives the wake signal, e.g., as an interrupt via a low frequency channel. In aspects, the tire monitor may be in a sleep or inactive state prior to receiving the wake signal. The device remote from the tire monitor may be any device, including but not limited to a handheld device (like the remote computing device 118), a computing device on the vehicle (like the tire pressure monitoring system 116), or something else. In specific examples, the device may be a device configured to communicate with the tire monitor to read/write the tire monitor.

At an operation 304, the process 300 includes, optionally, receiving with the wake signal, communication connection information. In some examples, the wake signal may be modulated to include information about a communication connection to be established. For example, the information, e.g., the modulation information, may be an identification of the device emitting the wake signal, an identification of a channel for communicating with the device, a key or signature for authorizing communication with the device, or other information. In examples, the modulation data may be used by the tire monitor to ensure pairing or connecting with the proper, e.g., the device that sent the wake signal.

At an operation 306, the process 300 includes scanning communication channels for a communication channel. Upon receiving the wake signal, e.g., via a wake-up receiver, communication components of the tire monitor begin scanning for a channel to facilitate communication with the device that sent the wake signal. When received, the scanning may include using the additional, modulation information.

At an operation 308, the process 300 includes establishing communication via the communication channel. For example, the tire monitor, via the communication components, will establish a connection with the remote device via the communication channel. In examples, the communication channel is a high frequency, bidirectional channel, such as a channel associated with BLE or other communication protocols. In examples, establishing the communication channel can include authorizing or otherwise confirming communication using the modulated information received with the wake signal.

At an operation 310, the process 300 includes communicating via the communication channel. Without limitation, the operation 310 can include the device reading/writing information to the tire monitor, receiving, at the remote device, information from the sensor, or the like. In at least some examples, data transferred by the tire monitor via the communication channel can include sensor data. In other examples, the data transferred to the tire monitor can be programming information.

At an operation 312, the process 300 includes, based at least in part upon completing communication, configuring the tire monitor in an inactive state. Upon completing data transfer, the remote device can terminate the communication channel. Upon doing so, the tire monitor can configure the communication components (and other components) to a sleep or inactive state. In the sleep/inactive state the wake-up receiver will continue to "listen" for low-frequency wake signals. In other examples, the tire monitor can include functionality to enter the inactive/sleep state after a predetermined period of no activity, e.g., a period in which no data is received from the remote device.

Embodiments of the present disclosure provide numerous advantages over existing approaches. The features described herein may address the severe reduction in battery life issue by utilizing LF circuitry within tire pressure monitor sensor hardware, to cause an interrupt, as the LF circuitry consumes minimal battery power. This is a significant improvement over the sensor constantly scanning the BLE channel, as may be used in standard BLE systems. The LF wake-up may further cause a further interrupt to a BLE chip, whereupon after receiving this interrupt, the BLE chip will begin the BLE connection process. The LF tool that caused the LF wake to occur may be ready to receive the BLE communications to allow the connection to be made very quickly, thus also solving the "poor sensor response latency." In order to achieve a fast response from a BLE-based tire monitor interrogation, in conventional systems, the tire pressure sensor must continuously scan the BLE channel in order to receive requests to enter connected mode. This continuous BLE scanning is energy consumptive and significantly reduces the battery life of a TPM sensor.

Embodiments of the present disclosure address the problems of the existing approaches as this solution uses an LF 'burst' from an interrogative device to wake up the sensor that subsequently initiates a BLE connection. Therefore, the scenario where the sensor is required to continuously scan the BLE channel no longer exists. Therefore, the energy that would otherwise be consumed (wasted) via the BLE channel is conserved thus making low response latency BLE interrogation possible. By adding a BLE channel, but using a LF wake-up as described herein, the tire monitor and interrogative tools can benefit from bidirectional faster data transfer rates enabled by BLE, but with significantly less energy consumption Aspects of this disclosure may also provide improved detection of unsafe driving conditions associated with tire pressure anomalies. For example, aspects of this disclosure can provide tire information at a faster rate, e.g., to an interrogation device, associated with the vehicle, a vehicle owner, a technician, a passenger, or other person associated with a vehicle, to more readily identify tire pressure anomalies and/or other tire-related issues.

As used in any embodiment described herein, the term "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment or embodiment herein may be implemented in software, firmware, hardwired circuitry and/or any combination thereof.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A vehicle comprising:
    a plurality of tires; and
    a tire monitor associated with a tire of the plurality of tires, the tire monitor being configured to perform operations comprising:
    receiving, from a computing device remote from the tire, a wake signal transmitted at a first frequency, the wake signal comprising a modulated signal including data associated with the remote computing device or the BLE connection;
    determining, at least in part in response to receiving the wake signal, a Bluetooth Low Energy (BLE) channel for corresponding with the computing device, wherein the first frequency is lower than a frequency associated with the BLE channel;
    establishing a BLE connection with the computing device via the BLE channel; and
    sending, via the BLE connection and to the computing device, the data associated with the tire.

2. The vehicle of claim 1, wherein the data associated with the computing device comprises at least one of a key, a signature, or an identification of the computing device.

3. The vehicle of claim 1, wherein the establishing the BLE connection is based at least in part on the data associated with computing device.

4. The vehicle of claim 1, wherein the wake signal is an interrupt with a frequency of between about 30 kHz and about 300 kHz.

5. The vehicle of claim 1, the operations further comprising:
    receiving, from the computing device and via the BLE connection, at least one of a request to read data from or to write data to the tire monitor.

6. The vehicle of claim 1, the operations further comprising:
    terminating, based at least in part on sending the data associated with the tire, the BLE connection.

7. The vehicle of claim 1, wherein the tire monitor is configured to wake from an inactive state upon the receiving the wake signal.

8. The vehicle of claim 7, the operations further comprising:
    configuring the tire monitor in the inactive state after a time period during which no communication is received from the computing device.

9. A method comprising:
    receiving, at a tire monitor associated with a tire, a wake signal comprising a modulated signal including data associated with a remote device;
    scanning, at the tire sensor and based at least in part on receiving the wake signal, one or more channels for a communication channel to communicate with the remote device, the communication channel having an associated second frequency higher than the first frequency;
    establishing communication with the remote device via the communication channel; and
    sending, via the communication channel and from the tire monitor, information about the tire.

10. The method of claim 9, wherein the wake signal is a low frequency interrupt.

11. The method of claim 10, wherein:
    the wake signal is received from the remote device.

12. The method of claim 11, wherein:
    the data associated with the remote device comprises at least one of a key, a signature, or an identification of the tire pressure monitoring system; and
    the establishing the communication channel is based at least in part on the data associated with the remove device.

13. The method of claim 9, wherein the communication channel is a Bluetooth Low Energy channel.

14. The method of claim 9, further comprising:
    configuring, at least in part based on sending the information about the tire, the tire sensor in an inactive state.

15. A tire monitor comprising:
    a sensor configured to generate information about a tire with which the tire sensor is associated; and
    a computing device configured to perform operations comprising:
    receiving, from a remote device, a wake signal transmitted at a first frequency, the wake signal comprises a modulated signal including information about the remote device or about the communication channel,
    scanning, based at least in part on the receiving the wake signal, a plurality of channels for a communication channel to communicate with the remote device, the communication channel having an associated second frequency higher than the first frequency, sending, via the communication channel and from the tire monitor, the information about the tire.

16. The tire monitor of claim 15, wherein the wake signal is a low frequency interrupt.

17. The tire sensor of claim 15, the operations further comprising:
establishing the communication channel based at least in part on the information about the remote device or about the communication channel.

18. The tire sensor of claim 15, wherein:
the receiving the wake signal comprises receiving the wake signal via a first channel and the first frequency is between about 30 kHz and about 300 kHz; and
the communication channel is associated with a second frequency equal to or greater than about 1 GHz.

* * * * *